United States Patent Office 3,803,087
Patented Apr. 9, 1974

3,803,087
PROCESS FOR PREPARING MODIFIED POLYMERS
Walter L. Vaughn, Lake Jackson, Tex., assignor to The Dow Chemical Company, Midland, Mich.
No Drawing. Filed Aug. 3, 1971, Ser. No. 168,757
Int. Cl. C08f 19/00, 27/00
U.S. Cl. 260—47 UP
4 Claims

ABSTRACT OF THE DISCLOSURE

An improved process for preparing polyolefin polymers having pendant and/or terminal side groups of the formula $$B-\overset{O}{\underset{\|}{C}}-R$$

wherein B is a segment of the polymer backbone and R is $-NHR_1$, $-NR_1R_2$, $-OR_1$, $-SR_1$ or $-OP(O_2)OR_1$, each $R_1$ and $R_2$ independently being the organic residue of a modifying compound of the formula HR, said modifying compound having a molecular weight of up to about 2000 and being reactive with organic anhydrides. Polymers containing said groups are prepared by reacting a polyolefin polymer containing pendant and/or terminal anhydride groups with said modifying compounds. The process results in fewer undesirable by-products.

BACKGROUND OF THE INVENTION

Polyolefin polymers containing pendant or terminal carboxylic acid groups, particularly those with relatively low molecular weights, are useful as coatings for textiles, metals, etc. It is particularly useful if the polymers can have modified acyl groups attached to the backbone, said groups imparting desirable properties to the substrate treated. One obvious advantage of these types of polymers is the permanence of the property, i.e., the properties are not lost as long as the coating is intact.

Existing processes for obtaining such polymers containing acyl-substituted side chains include the direct polymerization of monomers having such groups, such as acrylates, acrylamides, and the like, with olefins; or the modification of reactive polymers, such as maleic anhydride- or acid halide-containing polymers.

However, the above two approaches have drawbacks. In the first instance, the polymeric products obtainable are restricted by the availability of precursor monomers. Uncommon monomers are usually expensive and only available in small quantities.

In the second instance, modification of maleic anhydride-containing polymers results in polymers which contain relatively high numbers of free acid groups, which are of a lower order of reactivity, and, therefore, undesirable as coatings. Further, reactivity of maleic anhydride-containing polymers is very low, and generally requires extended reaction periods.

U.S. Pat. 3,441,545 (hereinafter '545 patent) teaches a method for obtaining modified polymers which comprises reacting an essentially linear addition polymer having at least some pendant acid halide moieties with at least one modifying compound, having a molecular weight of less than 2000, containing at least one group reactive with alkanoic acid halides.

The modification of acid halide-containing polymers such as is taught above, however, results in highly corrosive hydrogen halides in the reaction product. Also, the acid halide polymers readily hydrolyze to an insoluble form, thereby requiring anhydrous conditions. Further, the modification of carboxylic acid groups to acid halides by the technique of the art requires the use of highly corrosive reagents such as thionyl chloride.

SUMMARY OF THE INVENTION

It has now been found that modified polymers of the type prepared in accordance with the '545 patent may now be prepared from different starting polymers, thereby eliminating corrosive by-products and/or by-products which are difficult to separate, or the necessity to produce acid halide groups from acid groups.

In accordance with the present invention, modified polyolefin polymers are prepared which contain one or more groups of the formula $$B-\overset{O}{\underset{\|}{C}}-R \qquad (I)$$

by the reaction of an olefin-alkylene carboxylic acid copolymer containing anhydride groups of the formula $$B-\overset{O}{\underset{\|}{C}}-O-\overset{O}{\underset{\|}{C}}-R' \qquad (II)$$

with an organic compound having the desired modifying property and, in addition, an active hydrogen-containing group or its alkali metal derivative. In the above formulas, B is a segment of the polymer backbone; each R is, independently, $-NHR_1$, $-NR_1R_2$, $OR_1$, $-SR_1$ or $-OP(O)_2OR_1$, wherein each $R_1$ and $R_2$ is, independently, an organic residue of the modifying compound; and R' is an alkyl, cycloalkyl, aryl, aralkyl, alkaryl, or the like group, of up to about 20 carbon atoms.

The reaction may be carried out at any temperature at which the reagents are stable, usually from about 0° C. to about 150° C., in the presence or absence of an inert hydrocarbon or halohydrocarbon solvent such as benzene, toluene, cyclohexane, saturated hydrocarbon fractions obtained by the cracking of petroleum, methyl chloroform, trichloroethylene, perchloroethylene and the like, in which the copolymer is soluble at the reaction temperature. The reaction may further be carried out with the polymer swollen with solvent or with molten polymer as the medium to which the modifier is added. Pressure is suitably employed where the solvent would otherwise vaporize at the reaction temperature, but is otherwise not critical. Likewise, reduced pressure may be employed if the by-product is vaporizable at the reaction temperature and it is desirable or expedient to remove it as it forms. Although the ratio of reagents is preferably stoichiometric or greater with respect to the anhydride-containing polymer, less than stoichiometric quantities of the modifier may be employed. Similarly, when two or more modifying reagents are to be reacted with the polymer, they may be reacted in stepwise sequence or, where unreactive toward each other, simultaneously.

The '545 patent teaches that modifying compounds which (1) have a molecular weight of less than about 2000, and (2) contain at least one group reactive with acid halides, are suitable therein. Examples of such reactive groups include alcoholic hydroxyls, primary and secondary amines, mercapto groups, thiols, phosphines, and the alkali metal salt derivatives thereof.

Although the polymeric anhydride group will react with any nucleophilic compound, or alkali metal derivative thereof, organic compounds containing the specific nucleophiles taught in the above patent are preferred herein.

In addition to those compounds specifically named therein, the following are also suitable: 1H,1H-pentadecafluorooctyl alcohol; 1H,1H - heptafluorobutanol-1; ethylene glycol; bisphenol A; pentachlorophenol; N,N-dimethylaminoethanol; 1,4-dihydroxyanthraquinone; DL-tropic acid; α-phenyl-β-p-hydroxyphenylpropionic acid; urea; biuret; triuret; acetamide; formamide; and the like. Other modifying compounds which could be substituted for those above will be obvious to those skilled in the art.

The compounds employed as modifiers may contain one or more of these reactive groups which may be the same or different, and, if the same, may have a different reactivity because of the chemical structure adjacent to the reactive group. The compounds which are reacted with the anhydride-containing polymers to form the modified polymeric material are organic compounds which, in general, have a molecular weight of less than about 2000 and are generally monomeric compounds, although compounds having molecular weights greater than 2000 as well as low molecular weight polymeric materials which do not contain the active hydrogen-containing group in the repeating monomer unit are also within the scope of the modifiers which are reactive under the conditions of the present invention.

The amount of modifier reacted with the anhydride-containing polymer will differ depending on the proposed utility of the modified polymer. Thus, by variation in type and concentration of olefin and anhydride forming co-monomer (e.g., $\alpha,\beta$-unsaturated acid) and degree of reaction with the modifier, it is possible to tailor the polymeric modifiers to any particular application. The reaction of the anhydride group with the modifier can be controlled to give rise to complete conversion or a fraction thereof. More vigorous reaction conditions, e.g., longer reaction times and/or higher temperatures and/or higher concentrations of the modifier, will cause a higher degree of conversion. Optimum conditions will differ somewhat with each modifier and each starting polymer. In general, the reaction is most conveniently carried out by using excess quantities of modifier and letting the reaction proceed from about 40% to near complete conversion.

The polymers modified by the method of this invention may suitably have an average molecular weight of from about 800 to about 500,000, and preferably a molecular weight of from about 800 to about 12,000, most preferably about 800 to 8,000.

DETAILED DESCRIPTION OF THE INVENTION

While the conditions for producing modified polymers according to the '545 patent are suitable, the process scheme set out below is preferred in the instant invention:

(A) A polymer containing group of Formula II, optionally in a solvent (such as a halocarbon solvent) is contacted with one or more modifying compounds, which will impart the desired properties to the polymer, at a temperature of from about 0° to about 150° C. (preferably 50° to about 100° C.) for from about one minute up to several days; and (B) The organic volatiles are removed by evaporation utilizing heat and/or reduced pressure; or (C) The reaction mixture is added to a non-solvent (such as acetone) to precipitate the polymer, and the polymer recovered by filtration, decantation, or the like.

Optimum conditions will vary somewhat according to the modifying compound utilized, these conditions being known or easily determined by those familiar with the art.

The polyalkylene copolymers containing acid anhydride groups of Formula II above may suitably be prepared by treating an olefin-carboxylic acid copolymer which contains at least one group of the formula

with an acid anhydride of the formula

to form at least one group of Formula II. In the above formulas B is as defined above and R″ is the residue of an organic acid employed to form the anhydride.

The various polyalkylene precursor polymers needed to form said acid anhydride-containing copolymers are known to the art, generally being modified or non-modified olefin/acid or olefin/acid halide polymers. They may be prepared according to a number of U.S. Pats. including 3,441,545; 3,310,518; 3,361,842 and 3,413,272.

Said olefin/acid polymers are typically prepared by polymerizing an alpha olefin, such as ethylene and/or propylene, with an alpha-, beta-ethylenically unsaturated carboxylic acid, or its ester, in the presence of a catalyst and under super-atmospheric pressure. These polymers may then be modified to, for instance, acid halides, esters, amides and the like. They may be prepared from monomers which are well known in the art, including such compounds as alkenes and alkadienes, such as ethylene, propylene, butene, isobutene, pentene, hexene, octene, butadiene, isoprene, etc., (the term alkenes is intended to also include cycloalkenes, such as cyclohexene); unsaturated esters, such as acrylate- and methacrylate-containing monomers, such as alkyl and cycloalkyl (1 to 20 carbon atoms) acrylates and methacrylates, such as methyl methacrylate, ethyl acrylate, t-butyl acrylate, 2-ethylhexyl methacrylate, cyclohexyl acrylate and the like; vinyl acetate, vinyl propionate, vinyl butyrate, dimethyl maleate, diethyl maleate, ethyl hydrogen maleate, monoethyl fumarate and diethyl fumarate; nitriles and amides containing unsaturated groups, such as acrylonitrile, methacrylonitrile, acrylamide and methacrylamide; olefinically unsaturated carboxylic acids, such as acrylic acid, methacrylic acid, maleic acid, fumaric acid, itaconic acid and cinnamic acid; and chlorinated and brominated derivatives of the above.

There is the requirement, however, that the monomers used to prepare polymers containing groups of Formula II contain at least about 1 to 2 weight percent, preferably about 1 to about 45 weight percent, based on total starting polymer, of one or more monomers which will result in one or more carboxylic acid or ester groups pendant from, or terminal to, the polymer backbone.

Examples of said monomers include acrylic and methacrylic acids, itaconic acid, maleic acid, fumaric acid, ethyl acid maleate, cinnamic acid, crotonic acid and their esters, and the like.

These anhydride-containing polymers, then, may suitably be prepared by contacting from about 1.0 to about 80 weight percent (preferably about 20 to 60 weight percent) of the acid-containing polyalkylene copolymer in, optionally, a suitable inert anhydrous solvent, with at least about 1.0 equivalent (preferably 3 to 12 equivalents) of an acid anhydride per polymeric acid equivalent which is to be converted to anhydride, said reaction to occur at a temperature of from about 10° C. to the boiling point of the anhydride, and preferably at the reflux temperature.

Suitable anhydrides are of Formula IV above, wherein each R″ may be, independently, an alkyl or cycloalkyl group of up to about 20 carbon atoms, such as methyl, i-propyl, amyl, cyclohexyl, octyl, dodecyl, 1-methyl-6, 9-ethyl-undecyl, stearyl and the like; aryl such as phenyl, naphthyl and the like; and alkaryl and aralkyl of up to about 20 carbon atoms, such as ethylphenyl naphthylmethyl, phenylhexyl, hexylphenpropyl, diamylphenyl, dibutylnaphthyl and the like.

Acid anhydrides and mixed anhydrides of the following acids are, for example, suitable: acetic, propionic, butyric, valeric, capric, myristic, oleic, benzoic, toluic, naphthoic and the like. Preferred anhydrides include acetic, propionic, butyric, valeric and benzoic anhydrides.

For further details regarding these anhydride-containing polymers and methods for their preparation, see my co-pending application, Ser. No. 11,364, filed Feb. 9, 1970, entitled "Method for Preparing Mixed Anhydride-Containing Polymers."

Further, U.S. Pat. 3,529,924 teaches another method for producing anhydride-containing polymers by reacting an acid with acyl halide groups on a polyolefin polymer, or an acid halide with acid groups on said polymer.

SPECIFIC EMBODIMENTS

In a conventional reaction flask, about 25 gm. of ethylene-acrylic acid-acrylic acetic anhydride copolymer (87.8 weight percent—5.4 weight percent—16.8 weight percent), of 1700 molecular weight, was combined with 100 ml. of dry 1,1,1-trichloroethane and 25 gm. of 2-diethylaminoethanol (3.4 molar ratio of hydroxyl to anhydride), and refluxed (approx. 74° C.) for one hour. The product was precipitated in a water/acetone mixture (50/50), and then dried under vacuum. Infrared analysis indicated that the resulting lemon-yellow grease contained about 25 weight percent of 2-diethyl-aminoethyl acrylate moieties and about 5 weight percent of acrylic acid moieties. Little or no residual anhydride groups were observed. The modified polymer was useful as a textile lubricant and as an antistatic agent.

The following table contains data relevant to other adducts prepared by the method of and with the anhydride copolymer of the above example. Analysis was by infrared. Other polymers incorporating modifying groups are made by similar techniques and display similar utilities.

I claim:

1. A process for preparing modified polyolefin polymers which contain one or more groups of the formula

comprising contacting an olefin-olefinically unsaturated carboxylic acid copolymer containing anhydride groups of the formula

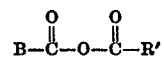

with an organic modifying compound having the desired modifying property and which, in addition, has an active hydrogen-containing group or its alkali metal derivative, wherein, in the above formulas, B is a segment of the polymer backbone; each R is, independently, $-NHR_1$, $-NR_1R_2$, $-OR_1$, $-SR_1$ or $-OP(O)_2OR_1$, $R_1$ and $R_2$ being, independently, organic residues of the modifying compound; and R' is an alkyl, cycloalkyl, aryl, alkaryl or aralkyl of up to about 20 carbon atoms.

2. The process of claim 1 wherein the said contacting

| No. | Modifier | Modified polymer | Wt. percent of mod. gp.[1] | Mol. rat.: nuc./ anh.[2] | Rxn. time (hours)[3] | Percent conv.[4] | Utility |
|---|---|---|---|---|---|---|---|
| 1 | 3-chloropropanol | B—C(=O)—O—(CH₂)₃Cl | 19 | 5.3 | 1 | 89 | Coatings. |
| 2 | 1-octadecanol | B—C(=O)—O—(CH₂)₁₇CH₃ | 30 | 2.4 | 3 | 78 | Do. |
| 3 | β-Naphthol | B—C(=O)—O—(naphthyl) | 17 | 4.5 | 6 | 66 | U.V. stabilizer. |
| 4 | Bisphenol A | B—C(=O)—O—C₆H₄—C(CH₃)₂—C₆H₄—OH | 14 | 2.8 | 6 | 64 | Antioxidant. |
| 5 | 1-dodecanethiol | B—C(=O)—S—(CH₂)₁₁CH₃ | 16 | 3.4 | 4 | 50 | Coating. |
| 6 | 3,5-di-t-butyl-4-hydroxybenzyl alcohol. | B—C(=O)—O—CH₂—C₆H₂(t-But)₂—OH | 16 | 1.2 | 1 | 41 | Antioxidant. |
| 7 | 2-dimethylaminoethanol | B—C(=O)—O—(CH₂)₂N(CH₃)₂—H⊕ | >12 | 3.4 | 1 | >50 | Antistatic. |
| 8 | DL-tropic acid | B—C(=O)—O—CH₂—CH(C₆H₅)—C(=O)—OH | >15 | 2.0 | 2 | >50 | Do. |
| 9 | α-Phenyl-β-p-hydroxyphenyl propionic acid. | B—C(=O)—O—C₆H₄—CH₂—CH(C₆H₅)—C(=O)—OH | >15 | 1.2 | 15 | >50 | Do. |

[1] Wt. percent of total polymer represented by modifying group.
[2] Molar ratio: Nucleophile/anhydride group.
[3] Reaction time (hours) at solvent reflux—i.e., 74° C.
[4] Percent conversion of anhydride groups to modified form.

is done at a temperature in the range of from about 0° to about 150° C.

3. The process of claim 1 wherein the said contacting is done for a period of time of from about one minute up to several days.

4. The process of claim 1 wherein the said contacting is done in the presence of an inert solvent.

References Cited

UNITED STATES PATENTS

| 2,977,334 | 3/1961 | Zopf, Jr. | 260—27 |
| 3,299,184 | 1/1967 | Whithworth, Jr. | 260—897 |
| 3,301,700 | 1/1967 | Maloney | 117—118 |
| 3,336,259 | 8/1967 | Zimmerman | 260—47 |
| 3,388,106 | 6/1968 | Muskat | 260—78.5 |

JAMES A. SEIDLECK, Primary Examiner

C. A. HENDERSON, Jr., Assistant Examiner

U.S. Cl. X.R.

260—79.7, 80.73, 80.8, 80.81, 86.7, 88.1 R, 88.1 PC